United States Patent [19]
Norris

[11] Patent Number: 6,154,420
[45] Date of Patent: Nov. 28, 2000

[54] SEISMIC STREAMER TRIM SECTION

[75] Inventor: Michael W. Norris, Cypress, Tex.

[73] Assignee: Western Atlas International, Inc., Houston, Tex.

[21] Appl. No.: 09/109,640

[22] Filed: Jul. 2, 1998

[51] Int. Cl.$^7$ .................................................. G01V 1/38
[52] U.S. Cl. ........................ 367/16; 367/17; 181/110
[58] Field of Search .................. 367/17, 18, 16, 367/154, 191, 20; 181/110; 114/245, 244

[56] References Cited

U.S. PATENT DOCUMENTS

| | | | |
|---|---|---|---|
| 3,749,045 | 7/1973 | Angus et al. | 114/235 |
| 4,135,141 | 1/1979 | Caldwell et al. | 114/245 |
| 4,745,583 | 5/1988 | Motal | 367/18 |
| 4,953,146 | 8/1990 | McMurry | 367/191 |
| 5,278,804 | 1/1994 | Halvorsen | 367/18 |
| 5,596,943 | 1/1997 | Horton | 114/245 |
| 5,642,330 | 6/1997 | Santopietro | 114/244 |

*Primary Examiner*—Hezron Williams
*Assistant Examiner*—Anthony Jolly
*Attorney, Agent, or Firm*—Alan J. Atkinson

[57] ABSTRACT

A system for selectively tuning the buoyancy of a marine seismic streamer or underwater cable. Trimming weights are positioned along the streamer cable and can be integrated within a solid buoyancy member or can be located within an outer streamer sheath. The weights overcome the flotation forces provided by an internal buoyancy section to control the elevation of the streamer section. The outer streamer sheath can be opened to permit the removal or addition of trimming weights to the streamer section, and can be resealed to prevent water from intruding into the streamer interior. A single trimming weight can be positioned along the buoyancy member, or a plurality of trimming weights can be used. The trimming weights permit a tight buoyancy range to be accomplished without increasing water drag forces or noise as the streamer is towed.

19 Claims, 2 Drawing Sheets

SEISMIC STREAMER TRIM SECTION

BACKGROUND OF THE INVENTION

The present invention relates to the field of marine seismic exploration. More particularly, the invention relates to a system for trimming marine seismic streamers by selectively adjusting the buoyancy of such streamers.

Seismic streamer cables are towed in the water behind marine seismic vessels. The vessels tow acoustic energy sources such as air guns to generate energy for penetrating subsurface geologic formations, and the streamers support hydrophones for detecting energy reflected from the subsurface formations. The streamers typically comprise hydrophone strings, other electrical conductors, and buoyancy material. A flexible jacket surrounds the streamer exterior to reduce frictional drag through the water, to prevent water intrusion, and to resist damage to the electrical conductors and buoyancy billets.

Typical streamer cables are three to eight kilometers in length and are towed below the water surface to avoid surface wave action and other environmental factors detrimental to the seismic operations. The elevation of the streamers is selected for the water conditions, depth, and for the desired seismic data requirements. Control over the streamer elevation is critical to the accuracy of the acoustic source energy generated and to the reflected signal reception by hydrophories attached to the streamers. The streamer elevation may be uniform or varied over the entire streamer length.

Buoyant seismic cables are identified in U.S. Pat. No. 3,795,759 to Rhyne (1974), wherein a plurality of inflatable buoyancy devices were attached to the cable casing and had gas transmission conduits for selectively providing gas through the cable to level individual buoyancy units. Another leveling concept was disclosed in U.S. Pat. No. 3,909,774 to Pavey (1974), wherein a pressure sensing switch and controller automatically controlled the flow of a buoyancy control liquid from a supply line to a streamer to increase buoyancy, and for discharging the control fluid to decrease streamer buoyancy. Other buoyant cables were disclosed in U.S. Pat. No. 4,496,796 to Matikainen et al. (1985) wherein heat from an interior conductor was transmitted to the outer cable sheath without passing through an interior cable float, and in U.S. Pat. No. 5,046,057 to Berniu (1991). wherein a flotation material was positioned around a central core member, electrical detectors were acoustically isolated from the core member, and the assembly was surrounded with an acoustically transparent material and an outer sheath material.

In U.S. Pat. No. 3,794,965 to Charske (1972), buoyancy of a marine seismic cable was controlled by the selective pumping of water into and out of flotation cells. A controller engaged with the flotation cells provided for continuous elevation adjustment of the cable system. In U.S. Pat. No. 4,709,355 to Woods et al. (1987), a computer monitored depth measurements and was capable of generating a signal for modifying the elevation of a diving body attached to the marine cable. In U.S. Pat. No. 4,745,583 to Motal (1988), the buoyancy of individual cable sections was controlled with a pump, elongated bladder, and buoyant fluid. Another device for leveling seismic marine cables was disclosed in U.S. Pat. No. 5,459,695 to Manison (1995), wherein a flotation tube within the seismic cable was selectively flooded to varying the seismic cable buoyancy. A longitudinal seam provided access to the streamer interior, and an environmentally safe gel filled the streamer interior. A reusable skin lock prevented water intrusion through the longitudinal seam into the streamer interior.

In U.S. Pat. No. 5,278,804 to Halvorsen (1994), detachable weights were connected to the outside surface of the streamer cable The outer shape of each weight were streamlined to reduce "noise" as the streamer and weights were towed through water. In U.S. Pat. No. 4,086,561 to Wooddy, Jr. (1978), individual weights were formed within heat shrinking tubing, which provided a retainer and a cover for the individual weights. The weight package was then attached to the streamer cable exterior with bands or straps. Other cable weights were disclosed in U.S. Pat. No. 4,953, 146 to McMurray (1990), U.S. Pat. No. 3,287,691 to Savit (1964), U.S. Pat. No. 2,791,019 to Du Laney (1957), and in U.S. Pat. No. 2,570,707 to Parr, Jr. (1951), Buoyancy for cables is typically provided by including a filling liquid or gel that has a density less than sea water, or by using plastic or glass microspheres embedded in a solid or semi-solid material. For solid core streamers, the buoyancy of each streamer section depends on the applicable manufacturing tolerances. In many circumstances, the streamer cable buoyancy can change over the streamer length due to varying manufacturing conditions. For example, buoyancy in a new streamer can range from three kilograms buoyancy per section to between ten and fifteen kilograms buoyancy per section. Manufacturing variances in the buoyancy per section can be caused by differences in billet sizes, in the adhesive materials binding individual components, and in other variables.

In addition to manufacturing variances, the buoyancy of streamer cables can become reduced over time due to different factors such as compression or "set" of the buoyant microspheres caused by variations in streamer cable depth. Mild degradation of section buoyancy is experienced due to the deployment and retrieval cycling of a seismic streamer. Larger and sometimes permanent buoyancy loss is experienced when cables dive to deeper depths to avoid surface obstacles and hazards. Catastrophic loss of buoyancy can happen when sections are accidentally driven to extreme depths. The sinking of the streamer cable can subject the streamer to extreme underwater pressures. Under such pressure, solid buoyancy streamers can assume a permanent set, and embedded microspheres partially or completely collapse and reduce the cable buoyancy. In extreme conditions, the streamer can become negatively buoyant from collapse of the microspheres.

Damage to a streamer or individual section length requires streamer replacement or repair. The entire billet material can be removed and replaced with a new buoyant material, however this process is expensive and cannot be readily performed in the field. Consequently, the damaged streamer section must be recovered from the water so that the streamer section can be replaced on-board the seismic vessel or at land based facilities.

In addition to manufacturing variances and buoyancy changes over time, seismic operations in different regions have different buoyancy requirements. Differences in temperature and salinity significantly affect streamer buoyancy, particularly for streamers filled with oil and other liquid and semi-liquid materials. Moving seismic operations from the North Sea to the Persian Gulf significantly changes the buoyancy performance of a streamer. Even within the same regions, variations in salinity across river deltas and tidal areas also significantly affects streamer buoyancy. Although streamers having solid buoyancy billets reduce the impact of temperature and salinity variations, buoyancy adjustments from along t he streamer are essential to the accurate collection of seismic data.

To adjust for quality control variations in the manufacture of streamer cables and other variations in the streamer buoyancy, external weights are typically positioned on the streamer exterior to tune the streamer buoyancy as described above. Such external streamer weights generate drag as the streamer is towed through the water and further generate signal noise detrimental to the quality of reflected signals detected by the hydrophones. Although the signal noise can be substantially removed with filtering techniques, signal noise adversely affects the c quality of detected data. In addition to these disadvantages of external streamer weight systems, the weights can scar and penetrate the exterior sheath protecting the streamer interior against water intrusion.

Accordingly, a need exists for an improved system for tuning the buoyancy of marine streamer cables, for adjusting to differing environmental conditions, and for easily accommodating natural loss of intrinsic buoyancy as the streamer sections age. The system should be capable of being implemented at the seismic survey site or the manufacturing facility, should permit fine adjustments to the marine streamer buoyancy, and should minimize disruption to seismic operations.

SUMMARY OF THE INVENTION

The present invention provides an apparatus and method for modifying the buoyancy of a marine streamer cable having a conductor. A, weight is engaged with the streamer cable at a selected position. The weight is movable to modify the buoyancy of the streamer cable at the selected position. In various embodiments of the apparatus, a weight can be positioned within the interior space defined by an exterior skin, and the weight can be moved from the selected position by detaching the weight or by moving the weight along the streamer.

The method of the invention is practiced by accessing the streamer cable it a selected position and by moving a weight engaged with a streamer cable to modify the buoyancy of the streamer at the selected position. In various embodiments of the method, additional weight can be removed from the streamer cable interior to balance the cable buoyancy over a selected cable length, the buoyancy of the streamer cable can be tested before or after the weight has been removed, and the exterior surface of a skin within the streamer can be sealed with heat, a patch, or other suitable technique.

DESCRIPTION OF THE PREFERRED EMBODIMENTS

The invention provides an apparatus and method for modifying the buoyancy of a marine seismic streamer. The invention permits the removal or addition of downwardly pulling weights to a selected streamer section to counterbalance the upward forces exerted by a buoyant component integrally contained within the marine seismic streamer. The flexibility provided by the addition or removal of weights facilitates tuning of the streamer buoyancy along the entire streamer length. As used herein, the terms "streamer", "cable" and "streamer cable" are the same. The invention is useful in modifying the buoyancy of streamers towed behind a seismic vessel, or streamer cables stationary or otherwise deployed in water.

Figure 1:
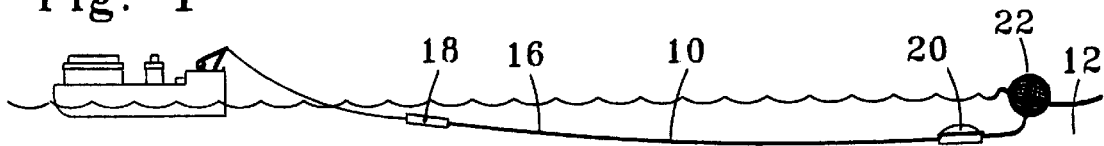
FIG. 1 illustrates a marine seismic streamer deployed in water.
Figure 2:
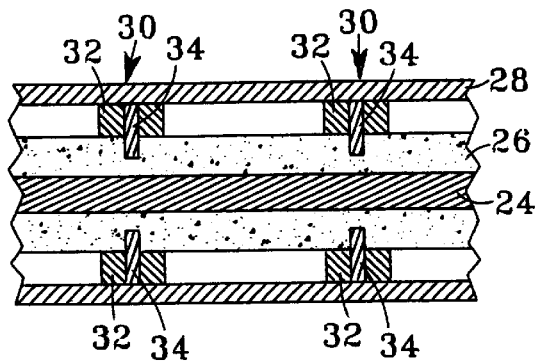
FIG. 2 illustrates a cross-sectional view of a weight attached to a streamer cable section.

FIG. 1 illustrates a marine seismic streamer 10 towed in water 12 behind vessel 14. Streamer 10 has an outer sheath 16, air guns 18 are towed behind vessel 14, and hydrophones 20 are supported by streamer 10. Tail buoy 22 supports the trailing end of streamer 10 and can carry equipment for positioning, data processing, and telemetry functions (not shown). FIG. 2 illustrates a cross-sectional view of streamer 10 comprising conductor 24, buoyancy member 26, and exterior skin or outer sheath 28. Weight 30 is positioned within outer sheath 28 before outer sheath is applied to streamer 10. Although FIG. 1 illustrates outer sheath 16, the invention is also suitable for streamers which do not have a sheath. In such use of the invention, weight 30 can be attached to or otherwise engaged with conductor 24 without positioning weight 30 within an interior space defined by an outer sheath. Alternatively, weight 30 can be integrated within buoyancy member 26 as described below.

Conductor 24 can perform different functions including the transmittal of signals, power, and operation as a strength member preventing parting or separation of streamer 10. Conductor 24 can comprise a metallic, fiber optic, or nonconductive material or composite of various materials having one or more properties. Conductor 24 can comprise a single wire or a group of strand elements.

The invention is particularly suited for use with solid buoyancy members. Buoyancy member 26 can be formed on the exterior surface of conductor 24 or can be attached as a combination of individual components. Buoyancy member 26 can comprise any material sufficient to provide a buoyant force preventing conductor 24 and outer sheath 28 from sinking within water 12. Buoyancy member 26 can be formed with a single material or composition of materials and can have its own protective surface or can be positioned within outer sheath 28 to avoid damage from hazards in water 12. In one inventive embodiment, buoyancy member 26 can comprise a plurality of buoyancy billets attached to fastened to conductor 24.

As shown in FIG. 2, weight 30 comprises one or more units attached to the exterior surface of buoyancy member 26. In one embodiment of the invention as illustrated, weight 30 comprises two opposing sections 32 connected with bolts 34 and fitted around the circumference of buoyancy member 26. Outer sheath 28 is then placed over buoyancy member 26 and weight 30 to prevent contact between water 12 and weight 30 and buoyancy member 26 and to provide a protective shield for such interior components. Other mechanical devices and configurations of weight 30 can be formed or constructed to position weight 30 within the interior of streamer 10. For example, weight 30 could be attached to the interior surface of outer sheath 28 or could be loosely positioned within the exterior space defined by outer sheath 28.

Figure 3:
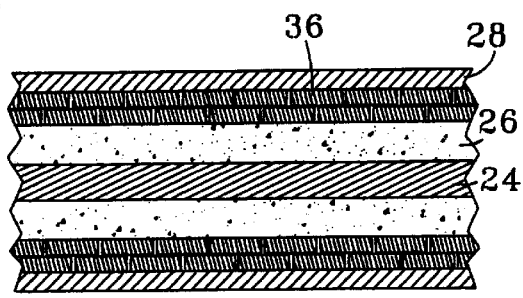
FIG. 3 illustrates a weight configured as a wrap around a buoyant member within the streamer cable interior.

In another embodiment of the invention, bolts 34 and other connecting devices can be eliminated and outer opposing weight sections 32 can retained in place by the presence of outer sheath 28. In another embodiment of the invention as illustrated in FIG. 3, a weight such as weight 36 can comprise a wrap structure positioned around the exterior surface of buoyancy member 26. Weight 36 can be unwrapped from such contact or can be cut away from contact with buoyancy member 26 to remove all or a portion of weight 36 from the space between buoyancy member 26 and outer sheath 28. Detachable weight tabs, protrusions, or other sectional components can be selectively removed from weight 30 in whole or in part as desired.

Figure 4:
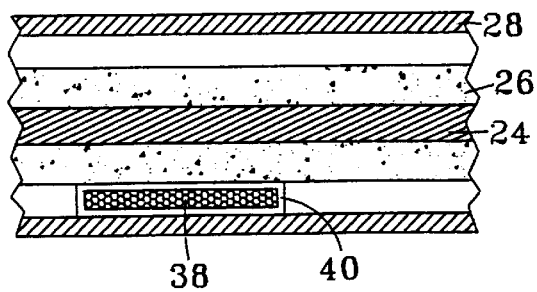
FIG. 4 illustrates a cross-sectional view of a isolation module for containing weights.

FIG. 4 illustrates another embodiment of the invention wherein one or more weights 38 are contained within isolation module 40. More than one module 40 can be positioned along streamer 10, providing selectively spaced access points for breaching the surface of outer sheath 28. One or more weights can be removed from or added to isolation module 40 to selectively balance the downward force counteracting the upward forces exerted by buoyancy member 26. The interior of isolation module 40 can be left open, can be filled with a foam or other lightweight filler material, or can be filled with a dense material if additional weight to the streamer section is desired.

Figure 5:
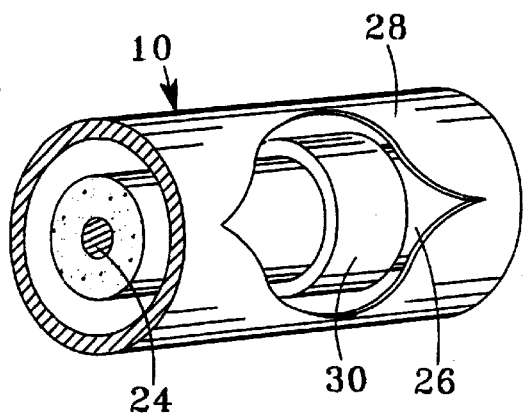
FIG. 5 illustrates an elevation view wherein the cable exterior surface is pierced to permit removal of a weight from a selected cable portion.
Figure 6:
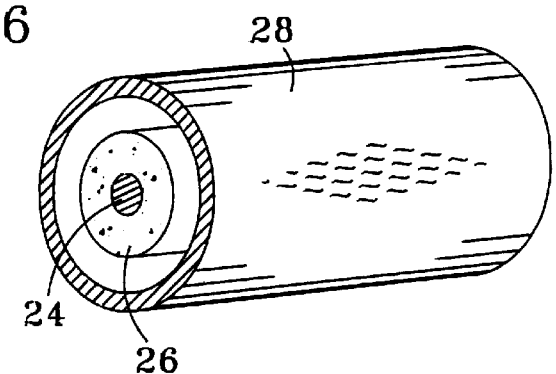
FIG. 6 illustrates the pierced cable which has been heat treated to seal the cable exterior surface.
Figure 7:
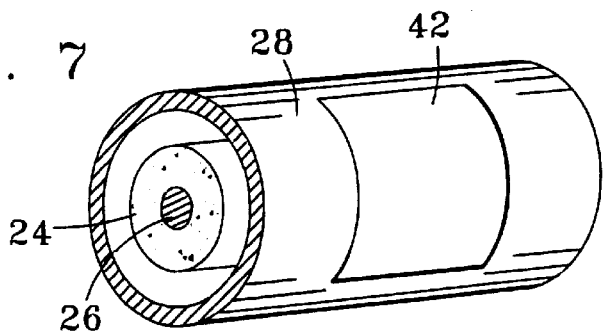
FIG. 7 illustrates a patch over the pierced cable exterior surface.

FIG. 5 illustrates an elevation view wherein outer sheath 28 has been cut, pierced, or otherwise opened to expose the interior of streamer 10. Such opening permits access to weight 30 so that all or part of weight 30 can be removed from the streamer interior to balance the buoyancy of the streamer section. The opening is then sealed to prevent water from intruding into the interior of streamer 10 when streamer 10 is returned to water 12. If cable sheath 28 comprises a flexible thermoplastic coat, the opening in cable sheath 28 can be resealed by heating procedures or by other sealant techniques known in the art. FIG. 6 illustrates a representative streamer exterior after the opening has been sealed with heat treating techniques, and FIG. 7 illustrates the application of a patch 42 to seal the opening in outer sheath 28. Patch 42 can be streamlined to reduce water drag operating against streamer 10. In other embodiments of the invention, a resealable opening can be positioned through outer sheath 28 to permit entry into the interior of streamer 10.

The invention has been described as having an exterior skin. Although this is a preferred embodiment, the exterior skin could be omitted for streamer cables that employ solid buoyancy materials. For these types of cables, the outer skin provides protection from abrasion and handling abuse and can provide improvements in the noise performance of the streamer cable. However, an external skin is not required for the invention when solid buoyancy materials are incorporated. The weights can be detachable or otherwise removable from the streamer section, or can be moveable along the streamer to selectively modify the buoyancy of a particular streamer section. In this manner, the invention provides flexibility in modifying the streamer section buoyancy by either moving a weight along the cable or by detaching a weight from a selected position.

Figure 8:
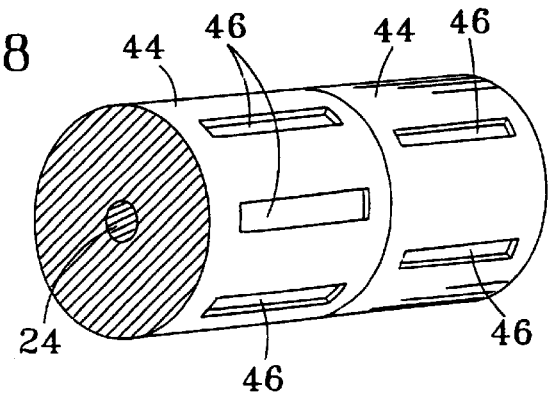
FIG. 8 illustrates a solid buoyancy member having a plurality of weights integrated into the buoyancy member.

In FIG. 8, buoyancy member 44 is positioned around conductor 24 without an external streamer sheath. A plurality of weights 46 are integrally formed within buoyancy member to provide for selectively adjustments to the buoyancy of the streamer. As illustrated, weights 46 are flush mounted with the exterior surface of buoyancy member 44 to provide an overall profile which does not increase drag and noise. Although individual covers can be positioned over each weight 46, and although an exterior streamer sheath could be fastened over all of weights 46 and buoyancy member 44, such covers are not essential to the practice of the invention, and do not modify the function of independent weights integrally formed within or cooperating with the solid buoyancy sections or billets.

The method of the invention is practiced by accessing the interior of streamer 10 through an opening in outer sheath 28, by moving a weight 30 engaged with an interior portion of streamer 10, and by sealing the outer sheath 28. For streamers which do not require an outer sheath, each weight 30 can be directly accessed and removed from the original position relative to buoyancy member 26. Weight 30 can be moved to another position along buoyancy member 26 or can be removed from streamer 10 altogether.

In other embodiments of the inventive method, a weight can be detached from a conductor 24 or from buoyancy member 26, can be severed or unwrapped or otherwise removed from within the interior of outer sheath 28, or can be removed from isolation module 40. Weight 30 can be selectively removed from one or more locations along streamer 10 to lighten the streamer section, thereby balancing the buoyancy of the particular streamer section. In addition to removing mass to lighten the streamer section, additional weight 30 can be added in this manner to facilitate overall streamer buoyancy balancing, or to selectively lower the elevation of a streamer section in water 12. After the streamer balancing is accomplished by adding or removing weight 30 from the interior of outer sheath 28, streamer 10 can be deployed into water 12. The buoyancy of streamer 10 sections can be tested with conventional procedures before additional seismic operations are undertaken and can be tested on board or in the water. The buoyancy of streamer 10 can be tested before or after weight 30 is moved from engagement with buoyancy member 26.

The invention provides a unique system for balancing the buoyancy of a marine seismic streamer or cable. Expensive, unreliable inflatable systems are avoided, and the inherent buoyancy of the conventional interior buoyancy member is utilized. If the buoyancy of the buoyancy member is impaired through an accidental severance of the streamer or the passage of time, the invention permits adjustments to selected streamer sections without requiring expensive replacement of the streamer or of the buoyancy member within the streamer. The invention permits field repairs and adjustments to be performed from a service boat without requiring retrieval of the entire streamer from the water. This ability to perform in- water repairs saves the time and expense of streamer retrieval and deployment operations, which is particularly valuable in large streamer arrays trailing tens of kilometers of streamer cable behind a seismic vessel.

The configuration and placement of weights within the outer sheath interior can be adjusted in different ways to facilitate the addition or removal of weights. By integrating the weights within the buoyancy material, or by penetrating through the outer sheath and by repairing the outer sheath opening, the streamer weight system is protected from streamer handling operations and from damage caused by water borne hazards. Additionally, seismic "noise" from external streamer weights is substantially eliminated, thereby improving the quality of the seismic data by eliminating undesirable signals and additional processing steps. Although a preferred embodiment of the invention contemplates the removal of weight from the interior of the outer sheath, the weight could be moved from one location to another location within the outer sheath interior to redistribute the weight within the streamer interior without removal of the weight.

By removing weight to increase the buoyancy of the local streamer section, greater control over the buoyancy balancing can be obtained when compared to conventional systems, which depend on the addition of buoyancy through mechanical or pneumatic inflation systems. This feature of the invention is particularly valuable during the manufacture of the streamer because the addition of small, distributed weights to the streamer before the outer sheath is attached can permit a tighter buoyancy range to be accomplished along the entire streamer length. A tighter buoyancy range facilitates streamer handling and reduces the overall handling time of streamer deployment.

Although the invention has been described in terms of certain preferred embodiments, it will become apparent to those of ordinary skill in the art that modifications and improvements can be made to the inventive concepts herein without departing from the scope of the invention. The embodiments shown herein are merely illustrative of the inventive concepts and should not be interpreted as limiting the scope of the invention.

What is claimed is:

1. An apparatus for modifying the buoyancy of a marine streamer cable having a buoyant member, comprising:
   a weight integrated within the buoyant member at a selected position along the streamer cable, wherein said weight is moveable from said selected position within said buoyant member to modify the buoyancy of the streamer cable at said selected position.

2. A marine streamer cable as recited in claim 1, further comprising a plurality of weights integrated within the buoyant member so that each weight is selectively moveable from engagement within the streamer cable at said selected position.

3. A marine streamer cable as recited in claim 1, wherein said weight is attachable within the streamer cable conductor.

4. A marine streamer cable as recited in claim 3, wherein said weight is detachable from said streamer cable.

5. A marine streamer cable as recited in claim 1, wherein said weight is selectively moveable from said selected position along said streamer.

6. A marine streamer cable as recited in claim 1, wherein the streamer cable has an exterior skin, and wherein said weight is attachable to an interior portion of the exterior skin.

7. A method for modifying the buoyancy of a marine streamer cable having a conductor and a buoyant member, comprising the steps of:
   accessing the buoyant member at a selected position along said streamer cable; and
   moving a weight integrated within the buoyant member to modify the streamer cable buoyancy at the selected position.

8. A method as recited in claim 7, wherein said weight is initially positioned within the buoyant member, further comprising the step of removing said weight from within the buoyant member.

9. A method as recited in claim 7, further comprising the step of moving more than one weight from the selected position along said streamer cable.

10. A method as recited in claim 7, wherein said weight is moved from the selected position to another position along the streamer cable.

11. A method as recited in claim 7, wherein said streamer cable has an exterior skin defining an interior portion of the streamer cable and said weight is positioned within said interior portion, further comprising the step of removing said weight from the interior portion of the streamer cable.

12. A method as recited in claim 11, wherein said weight is moved within said streamer cable interior portion without removing said weight outside of the cable exterior skin.

13. A method as recited in claim 11, further comprising the step of piercing said cable exterior skin to access the streamer cable interior.

14. A method as recited in claim 13, further comprising the step of heating the cable exterior skin to seal the exterior skin.

15. A method as recited in claim 14, further comprising the step of attaching a patch to the cable exterior skin to seal the exterior skin.

16. A method as recited in claim 7, further comprising the step of deploying the streamer cable into water.

17. A method as recited in claim 7, further comprising the step of testing the buoyancy of a selected portion of the streamer cable.

18. A method as recited in claim 17, further comprising the step of testing the buoyancy of the selected streamer cable portion before the weight is removed from engagement with the streamer cable.

19. A method as recited in claim 17, further comprising the step of testing the buoyancy of the selected streamer cable portion after said weight is removed from engagement with the streamer cable.

* * * * *